United States Patent
Yaman et al.

(10) Patent No.: US 9,654,314 B2
(45) Date of Patent: May 16, 2017

(54) JOINT TRANSMITTER AND RECEIVER MAP ALGORITHM FOR ENHANCING FILTERING TOLERANCE IN A BANDWIDTH-LIMITED SYSTEM

(71) Applicant: NEC Laboratories America, Inc., Princeton, NJ (US)

(72) Inventors: Fatih Yaman, Monmouth Junction, NJ (US); Shaoliang Zhang, Princeton, NJ (US); Yue-Kai Huang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/844,909

(22) Filed: Sep. 3, 2015

(65) Prior Publication Data

US 2016/0105297 A1 Apr. 14, 2016

Related U.S. Application Data

(60) Provisional application No. 62/063,018, filed on Oct. 13, 2014.

(51) Int. Cl.
| | |
|---|---|
| *H04B 10/00* | (2013.01) |
| *H04L 25/03* | (2006.01) |
| *H04B 10/58* | (2013.01) |
| *H04B 10/61* | (2013.01) |

(52) U.S. Cl.
CPC ....... *H04L 25/03859* (2013.01); *H04B 10/58* (2013.01); *H04B 10/616* (2013.01); *H04L 25/03171* (2013.01); *H04L 25/03343* (2013.01)

(58) Field of Classification Search
CPC ......... H04L 25/03859; H04L 25/03171; H04L 25/03343; H04B 10/58; H04B 10/616
USPC ......................................................... 398/159
See application file for complete search history.

(56) References Cited

PUBLICATIONS

Jian Hong Ke et al. ("400 Gbit/s single-carrier and 1 Tbit/s three-carrier superchannel signals using dual polarization 16-QAM with look-up table correction and optical pulse shaping" Optics Express, vol. 22, No. 1, Jan. 2014. pp. 71-83).*

(Continued)

*Primary Examiner* — M. R. Sedighian
(74) *Attorney, Agent, or Firm* — Joseph Kolodka

(57) ABSTRACT

A system for optimizing signal quality in an optical communication system is provided including a transmitter for converting digital signals to optical signals, the transmitter including a transmitter digital signal processing chip including a pre-distortion logic and a transmitter look-up table (LUT). A receiver is operatively coupled to the transmitter for receiving and converting the optical signals from the transmitter to digital signals. The receiver includes a receiver digital signal processing chip including a correction logic and a receiver look-up table (LUT). The transmitter LUT is constructed by scaling the receiver LUT by a weight factor and is iteratively updated based on a weighted sum of the receiver LUT.

17 Claims, 6 Drawing Sheets

(56) References Cited

PUBLICATIONS

Ke et al., "400 Gbit/s single-carrier and 1 Tbit/s three-carrier superchannel signals using dual polarization 16-QAM with look-up table correction and optical pulse shaping" Optics Express, vol. 22, No. 1, Jan. 2014. pp. 71-83.

Randel et al., "All-Electronic Flexibly Programmable 864-Gb/s Single-Carrier PDM-64-QAM", Optical Fiber Communication Conference (Optical Society of America, 2014), paper Th5C.8, Mar. 2014. (3 pages).

Cai et al., "Ultra-Long-Haul WDM Transmission with High Spectral Efficiency", IEICE Trans. Commun., vol. E94-B, No. 2, Feb. 2011, pp. 392-399.

\* cited by examiner

JOINT TRANSMITTER AND RECEIVER MAP ALGORITHM FOR ENHANCING FILTERING TOLERANCE IN A BANDWIDTH-LIMITED SYSTEM

RELATED APPLICATION INFORMATION

This application claims priority to provisional application No. 62/063,018 filed Oct. 13, 2014, the contents of which are incorporated herein by reference.

BACKGROUND OF THE INVENTION

Technical Field

The present invention relates generally to minimizing signal interference in communication networks, and more particularly, to a system and method for enhancing tolerance to the bandwidth filtering effect during transmission of signals over bandwidth limited communication channels in an optical communication system.

Description of the Related Art

Reducing noise and improving signal-to-noise (S/N) ratio in communication systems is a constant challenge. Traditional methods of optimizing S/N ratio include increasing the transmitted signal power and increasing the receiver sensitivity. Also, digital signal processing dramatically improves the sensitivity of a receiving unit.

Intersymbol interference (ISI) is another problem which occurs typically due to the transmission of a signal through a bandlimited channel, i.e., a channel where the frequency response is zero above a certain frequency (the cutoff frequency). Passing a signal through such a bandwidth limited channel causes a 'bandwidth filtering effect' in which there is removal of frequency components above this cutoff frequency and components of the frequency below the cutoff frequency may also be attenuated by the channel.

With regards, in particular, to optical communication systems, to achieve high-speed transmission rates (e.g., terabits/second per channel), multiple optical carriers typically have to be used to address the bottleneck caused by electronic components, such as drivers and digital-to-analog converters (DAC). However, due to the high cost of optical components, using less optical carriers are desirable. Moreover, such high-baudrate electrical signals usually suffer from serious intersymbol interference due to the limited bandwidth of the electronic components of the system.

Accordingly, a need exists for a system and method to improve signal quality in optical transmission systems in a cost effective and efficient manner.

SUMMARY OF THE INVENTION

In one aspect, a joint maximum a posterior (MAP)-based transmitter pre-distortion and receiver correction is provided which advantageously compensates for signal distortion (such as ISI effects) in an optical communication system.

Key features of a system and method according to an embodiment of the present principles include:
- Applying a joint transmitter-side MAP pre-distortion and receiver-side MAP correction for enhancing tolerance to the bandwidth filtering effect;
- Performing iterations between receiver-side MAP LUT and transmitter-side MAP LUT to precisely compensate for signal distortion (e.g., such as the ISI); and
- Utilizing a weight summation of receiver-side MAP LUTs for a more stable operation and refinement of the transmitter MAP pre-distortion operation.

A system for optimizing signal quality by mitigating signal distortion in an optical communication system is provided, comprising a transmitter for converting digital signals to optical signals comprising a transmitter digital signal processing chip including a pre-distortion logic and a transmitter look-up table (LUT); and a receiver operatively coupled to the transmitter for receiving and converting the optical signals from the transmitter to digital signals, the receiver comprising a receiver digital signal processing chip including a correction logic and a receiver look-up table (LUT), wherein the transmitter LUT is constructed by scaling the receiver LUT by a weight factor and is iteratively updated based on a weighted sum of the receiver LUT.

A receiver for mitigating signal distortion in an optical communication system is provided comprising receiver front ends for receiving an optical signal; and a receiver digital signal processing chip (DSP) operatively connected to the receiver front ends, the receiver DSP including a correction logic and a receiver look-up table (LUT), wherein the correction logic compares received optical signals with the transmitted optical signals to determine and apply a maximum a posterior (MAP) based correction, and wherein the receiver LUT is scaled by a weight factor.

A method for optimizing signal quality in an optical communication system is provided comprising the steps of: applying maximum a posterior (MAP) based pre-distortion on digital signals at a transmitter, based on a transmitter look-up table (LUT); processing and up-converting the digital signals to comprise optical signals; processing the optical signals at a receiver to comprise digital signals; applying MAP based correction to the digital signals at the receiver based on a receiver LUT, wherein the transmitter LUT is built up and updated based on the receiver LUT.

These and other advantages of the invention will be apparent to those of ordinary skill in the art by reference to the following detailed description and the accompanying drawings.

DETAILED DESCRIPTION

Figure 1:
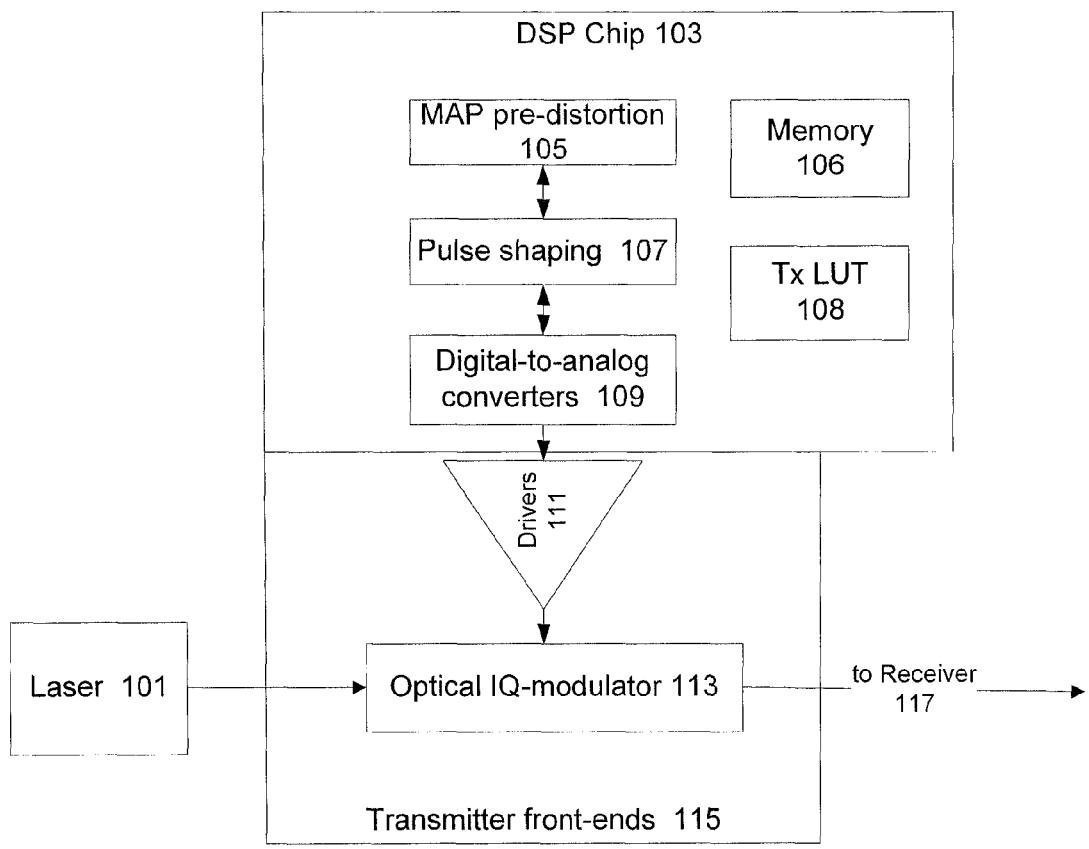
FIG. 1 shows an exemplary transmitter used in a system in which the present principles may be implemented, in accordance with an embodiment of the present principles.

The present invention is directed to optimizing performance of communication systems by employing a joint maximum a posterior (MAP)-based transmitter pre-distortion and receiver correction which advantageously compensates for signal distortion (such as ISI effects) and further enhances tolerance to the bandwidth filtering effect in an optical communication system. That is, a key feature of a system and method of the present principles is the joint performance of a transmitter MAP pre-distortion and receiver MAP correction.

In one embodiment according to the present principles, not only is the MAP estimation algorithm performed at the transmitter (Tx) side, but the MAP algorithm is also applied to the received signals at the receiver (Rx) side to further enhance the tolerance to the bandwidth filtering effect.

In a preferred embodiment, a transmitter-side MAP LUT is updated several times by examining the signals received at the receiver side until convergence, thus addressing most of the ISI effects. That is, after applying MAP based pre-distortions each time at the transmitter side, the received signals are further examined to create a receiver-side MAP LUT which is further used to update the transmitter-side MAP based pre-distortion for the next iteration. As a result, a system and method according to the present principles provides increased performance improvement compared to, e.g., a separate Rx MAP or separate Tx MAP scheme.

In addition, the MAP based pre-distortion is performed by summing up the entries in the MAP LUTs with different weights, thus maximizing the improvement in performance. Using a weighted sum of MAP LUTs further helps resolve the issue of convergence problems which can be caused by performing multiple iterations to update the LUT, thus providing a more stable MAP based pre-distortion in the system.

That is, after applying the transmitter MAP pre-distortion each time, the receiver MAP LUT will be fed back to the transmitter and is summed up by a weight factor $w_i$ to update the transmitter MAP LUT. Such iterations between transmitter and receiver help make the MAP pre-distortion accurately compensate for the ISI occurred at the transmitter side, and improves over existing approaches.

Finally, the application of a joint Tx and Rx MAP algorithm in accordance with the present principles helps reduce the cost of transponder by enabling the use of low-speed DACs for generating high-baud signals with Nyquist shaping to reduce the channel crosstalk.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements, FIG. 1 shows an exemplary transmitter 100 illustratively depicted in accordance with an embodiment of the present principles. The transmitter 100 includes a digital signal processing (DSP) chip 103 operatively coupled to transmitter front ends 115. The transmitter front ends 115 may include one or more components such as an optical IQ (in-phase quadrature) modulator 113, drivers 111, and a laser 101 for providing light to be processed by the transmitter 100 for providing optical signals to a receiver.

The DSP chip 103 includes a maximum a posteriori probability (MAP) pre-distortion logic 105 operatively connected to a pulse shaping filter 107 and digital-to-analog converters 109. One or more memory devices 106 may be provided within or external to the chip 103, and may include a transmitter-side Look-up-Table (Tx LUT) 108.

Figure 2:
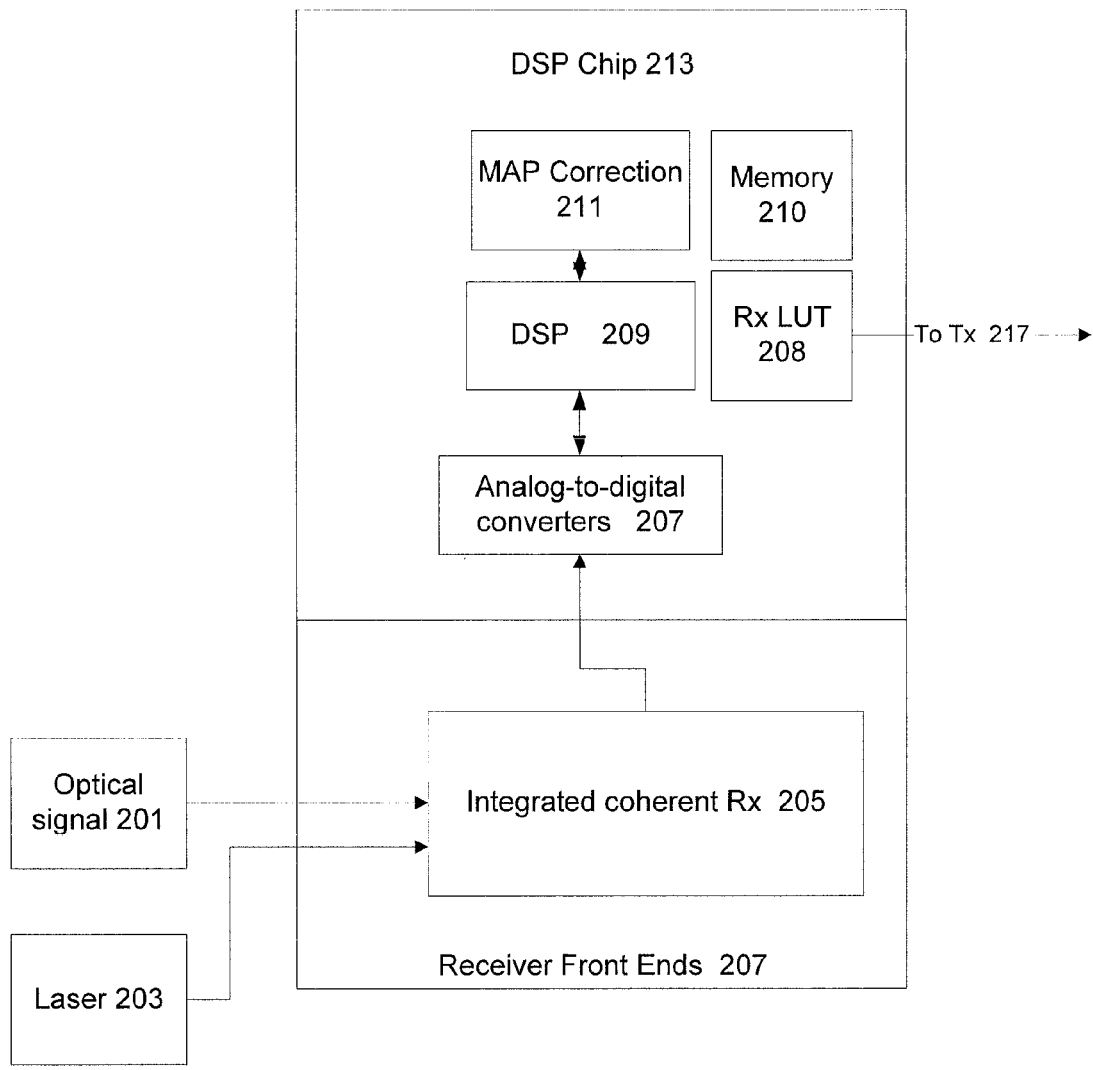
FIG. 2 shows an exemplary receiver used with the transmitter of FIG. 1 in a system in which the present principles may be implemented, in accordance with an embodiment of the present principles.

FIG. 2 shows an exemplary receiver 200 used with the transmitter of FIG. 1 in a system in which the present principles may be implemented, in accordance with an embodiment of the present principles. The receiver 200 includes a digital signal processing (DSP) chip 213 operatively coupled to receiver front ends 207. The receiver front ends 207 are configured to receive the optical signal from the transmitter 100 and may include one or more components such as an integrated coherent receiver 205 and a laser 203. For example, the laser 203 provides a signal which beats with and downconverts the optical signal to a baseband signal, to enable the integrated receiver 205 to detect the signal amplitude and phase.

The DSP chip 213 includes a maximum a posteriori probability (MAP) correction logic 211 operatively connected to a digital signaling processor 209 and analog-to-digital converters 207. One or more memory devices 210 may be provided within or external to the chip 213, and may include a receiver-side Look-up-Table (Rx LUT) 208. The Rx LUT is operatively coupled (217) to the transmitter 100, such that after MAP correction is performed, the Rx LUT may be used to further update the transmitter-side LUT to be applied to the MAP based pre-distortion for the next iteration.

Figure 3:
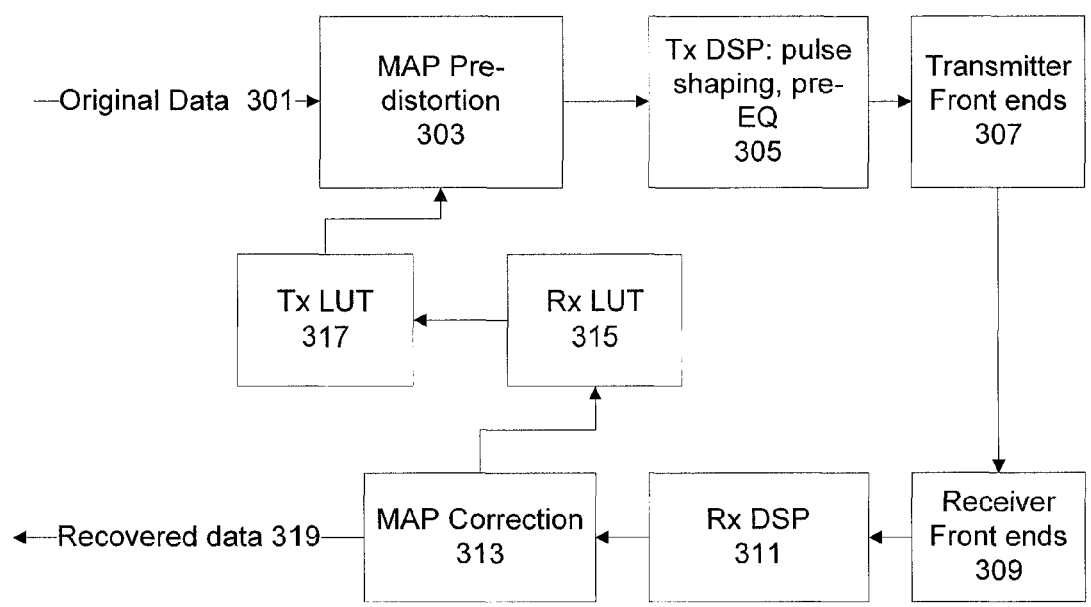
FIG. 3 shows a flow diagram of an exemplary method for conducting joint transmitter and receiver functions for mitigating signal distortions, in accordance with an embodiment of the present principles.

FIG. 3 shows a flow diagram of an exemplary method for conducting joint transmitter and receiver functions for mitigating signal distortions in a typical transmission system using a Tx and Rx as shown in FIGS. 1 and 2, in accordance with an embodiment of the present principles. The original data (301) is first pre-distorted by LUT-based MAP algorithm (step 303), whose outputs are further processed by transmitter digital signal processing (DSP) units (step 305) for pulse shaping and pre-equalization before up-converting to the transmitter front ends (step 307).

At the receiver side, the incoming optical signals are down-converted at the receiver front ends into baseband (step 309) and are recovered by a series of Rx DSP algorithms (step 311). Afterwards, Rx-side MAP correction (step 313) is applied to further remove any residual ISI effects of the signal to improve signal quality. The MAP algorithm is implemented by utilizing LUTs both at the transmitter (317) and receiver side (315) for facilitating the processing. The Tx-side LUT (317) is built up based on the Rx-side LUT (315), as discussed further below with respect to FIG. 4.

Figure 4:
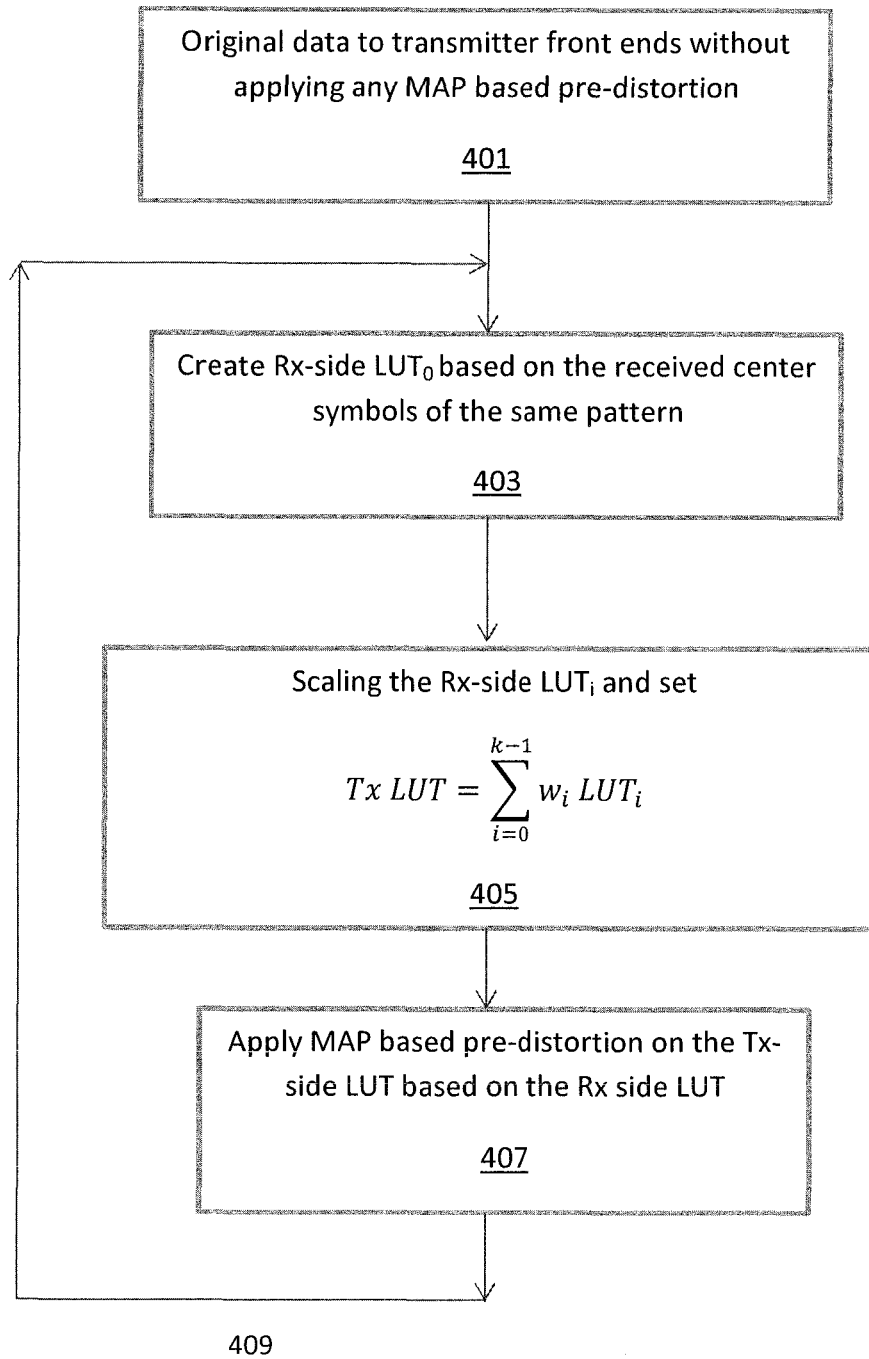
FIG. 4 shows a flow diagram of an exemplary method for building and updating a transmitter side look-up-table based on a receiver side look-up-table, in accordance with an embodiment of the present principles.

FIG. 4 shows a flow diagram of an exemplary method for building and updating a transmitter side look-up-table based on a receiver side look-up-table, in accordance with an embodiment of the present principles. "Original" data (data without any MAP based pre-distortion applied) directly passes through the transmitter front-ends (step 401) and is received at the receiver. An initial $LUT_0$ is created at the receiver side (step 403). The receiver side $LUT_0$ is scaled by a weight $w_0$ to create the transmitter-side LUT (step 405). A MAP based pre-distortion (based on the receiver side LUT) is applied at the transmitter side for pre-distorting the transmitted signal (step 407).

Preferably, the process of blocks 403, 405, 407 is repeated until convergence is reached. For example, a system and method of the present principles will preferably apply a MAP based pre-distortion on the digital signals at the transmitter based on the updated transmitter LUT, until a threshold is met, wherein the threshold may comprise a desired level of signal quality.

Also, the weights $w_i$ are preferably carefully adjusted in accordance with the desired level of signal quality for optimizing the performance of the system.

Table 1 below is for illustrative purposes only, showing the exemplary entries of a transmitter LUT for a MAP pre-distortion of a binary phase shift keying (BPSK) signal with a memory length of 3 symbols:

TABLE 1

Transmitter LUT for 3-symbol MAP pre-distortion of BPSK signals

| Pattern Entries | Index | Pre-distortions for center symbol |
|---|---|---|
| −1 −1 −1 | 0 | −0.12 |
| −1 −1 1 | 1 | 0.05 |

TABLE 1-continued

Transmitter LUT for 3-symbol MAP pre-distortion of BPSK signals

| Pattern Entries | Index | Pre-distortions for center symbol |
|---|---|---|
| −1 1 −1 | 2 | 0.22 |
| −1 1 1 | 3 | −0.05 |
| 1 −1 −1 | 4 | 0.05 |
| 1 −1 1 | 5 | −0.22 |
| 1 1 −1 | 6 | −0.05 |
| 1 1 1 | 7 | 0.12 |

For example, to calculate MAP pre-distortion values to create a LUT, we use the following:

$$s^i = [s^i(k+L) \ldots s^i(k+1)s^i(k)s^i(k-1) \ldots s^i(k-L)]$$

wherein all characters within the above brackets represent 2L+1 symbols, k represents a symbol indice, L is the MAP memory length, and $s^i$ represents ith pattern entry with 2L+1 symbols.

After passing the optical front-ends, the signal typically suffers inter-symbol interference/distortions because of the limited bandwidth of the front-ends. All sequences $r^i$ belonging to $s^i$ are calculated and averaged out. For example, we calculate a total N $r^i$ (i.e., $r^i(0), \ldots, r^i(N-1)$), at the receiver side:

$$r^i(0) \equiv [r^i(k_0+L) \ldots r^i(k_0+1)r^i(k_0)r^i(k_0-1) \ldots r^i(k_0-L)]$$

$$r^i(1) \equiv [r^i(k_1+L) \ldots r^i(k_1+1)r^i(k_1)r^i(k_1-1) \ldots r^i(k_1-L)]$$

$$r^i(N-1) \equiv [r^i(k_{N-1}+L) \ldots r^i(k_{N-1}+1)r^i(k_{N-1})r^i(k_{N-1}-1) \ldots r^i(k_{N-1}-L)]$$

and we average the symbols which are at the same position as follows:

$$\bar{r}^i \equiv \frac{1}{N}\left[\sum_{n=0}^{N-1} r^i(k_n+L) \ldots \sum_{n=0}^{N-1} r^i(k_n+1) \sum_{n=0}^{N-1} r^i(k_n) \sum_{n=0}^{N-1} r^i(k_n-1) \ldots \sum_{n=0}^{N-1} r^i(k_n-L)\right]$$

The average will provide the pre-distortion value, but as shown in this example, preferably we only use the value of the center symbol. Namely, in one exemplary embodiment the center symbol is preferably selected since it receives the same amount of distortion from its neighboring symbols, thus advantageously maximizing effectiveness of the MAP pre-distortion and correction.

For example, a MAP detection algorithm may be applied at the receiver side by examining the signal amplitude distribution over a memory length of L symbols. The LUT may be built up by examining the pattern-dependent ISI over in-phase and quadrature separately when there are no MAP-based pre-distortions at the transmitter side. The received signals $[r_{k-\lfloor L/2 \rfloor}, r_{k-\lfloor L/2 \rfloor+1}, \ldots, r_k, \ldots, r_{k+\lfloor L/2 \rfloor-1}]$ are compared with the transmitter pattern (L is the MAP memory length) to determine the MAP corrections on the center symbols ($\Delta c(k) = s_k - r_k$).

Figure 5A:
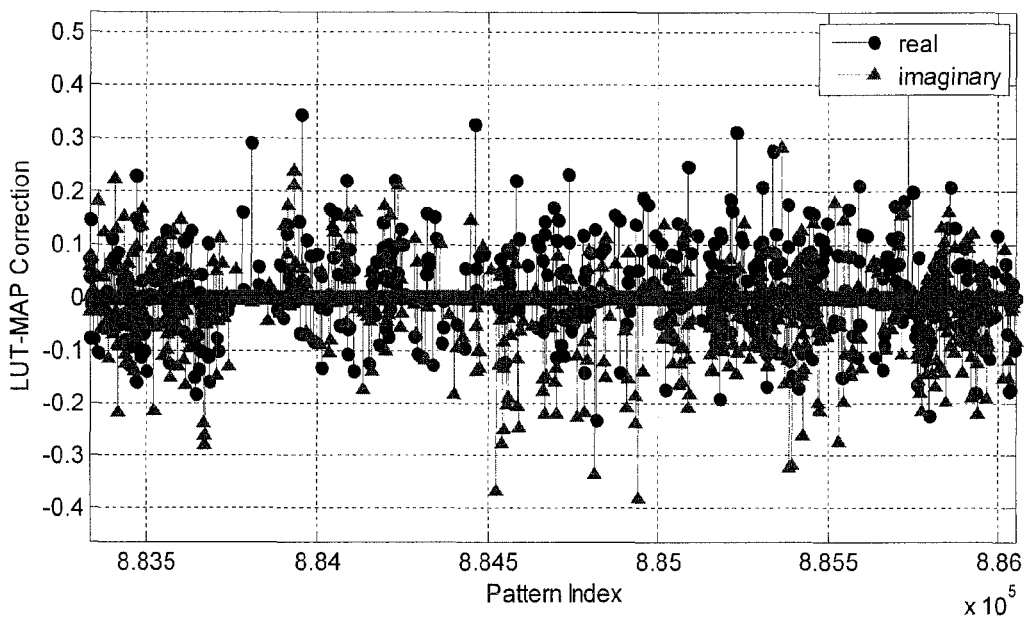
FIG. 5A depicts an exemplary graph showing a MAP based transmitter pre-distortion applied to quadrature signals, in accordance with an embodiment of the present principles.
Figure 5B:
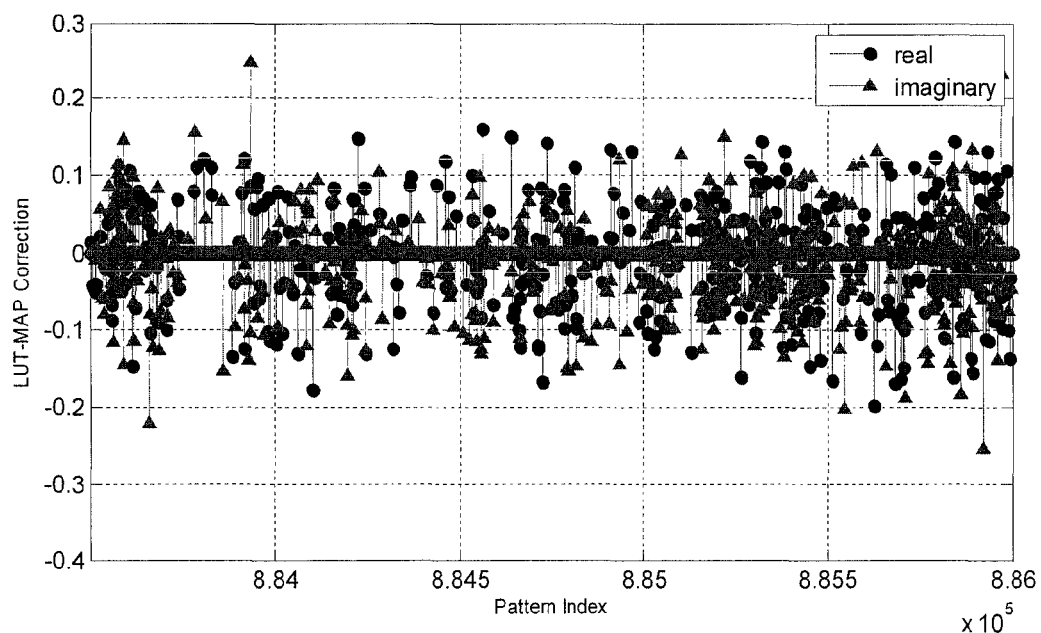
FIG. 5B depicts an exemplary graph showing a MAP based receiver correction and MAP based transmitter pre-distortion applied to quadrature signals, in accordance with an embodiment of the present principles.

FIG. 5A is an exemplary graph showing a MAP based transmitter pre-distortion, applied to quadrature signals, namely to a 52.1 Gbaud 8QAM scheme, in accordance with an embodiment of the present principles. FIG. 5B is an exemplary graph showing a MAP based transmitter pre-distortion and a MAP based receiver correction, applied to quadrature signals, namely to a 52.1 Gbaud 8QAM scheme, in accordance with an embodiment of the present principles. However, in addition to BPSK and 8QAM, it is contemplated that a system and method of the present principles may be applied to any other modulation format, such as QPSK, 16QAM, etc.

That is, FIGS. 5A and 5B comprise graphical depictions of a joint Tx MAP pre-distortion and Rx MAP correction according to the present principles applied to generate 52.1 Gbaud 8QAM signals in experiments. Namely, FIG. 5A shows the partial 9-symbol transmitter MAP pre-distortion of 52.1 Gbaud 8QAM. FIG. 5B shows the partial 9-symbol receiver MAP correction of 52.1 Gbaud 8QAM.

Figure 6A:
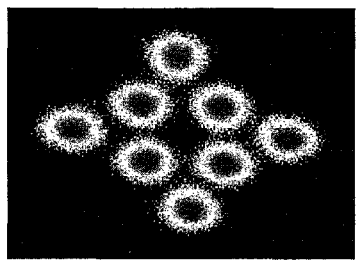
FIG. 6A shows an exemplary resultant constellation plotted when no MAP pre-distortion or MAP correction of signals is not applied.
Figure 6B:
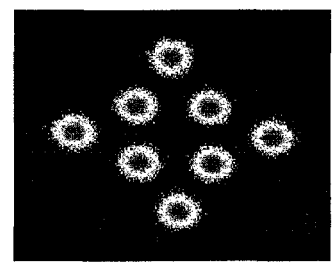
FIG. 6B shows an exemplary resultant constellation plotted from FIG. 5A when MAP based pre-distortion of transmitter signals is applied, in accordance with an embodiment of the present principles.

FIGS. 6A and 6B depict exemplary plotted constellation points. Namely, FIG. 6A shows an exemplary resultant constellation plotted when MAP based pre-distortion of transmitter signals is not applied. For example, the exemplary constellation of FIG. 6A can represent the constellation points after digital signal processing (of block 209 in FIG. 2) is performed.

FIG. 6B shows an exemplary resultant constellation plotted when MAP based pre-distortion of transmitter signals is applied, in accordance with an embodiment of the present principles. That is, by applying the 9-symbol MAP LUTs for pre-distorting the transmitter signals in accordance with aspects of the present principles, the resultant constellation is plotted in FIG. 6B.

In a comparison of the exemplary constellations of FIG. 6A and FIG. 6B, when MAP pre-distortion of transmitter signals is applied (FIG. 6A), this improves the Q-factor by >2.5 dB compared to the constellation without MAP pre-distortion (FIG. 6A).

Figure 7A:
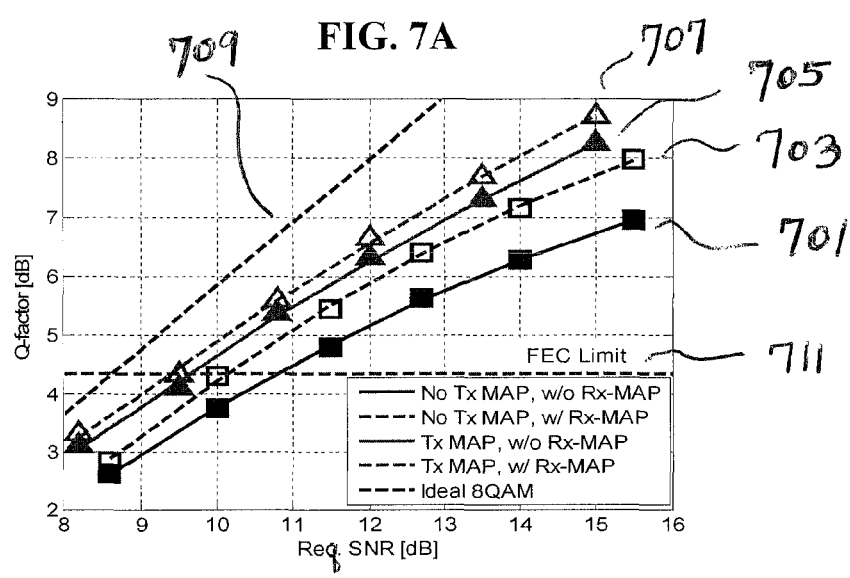
FIG. 7A depicts an exemplary graph illustrating a back-to-back (BTB) QAM performance comparison when applying MAP based pre-distortion at the transmitter side and/or MAP based correction at the receiver side, as compared with a baseline signal and FEC limit, in accordance with an embodiment of the present principles.
Figure 7B:
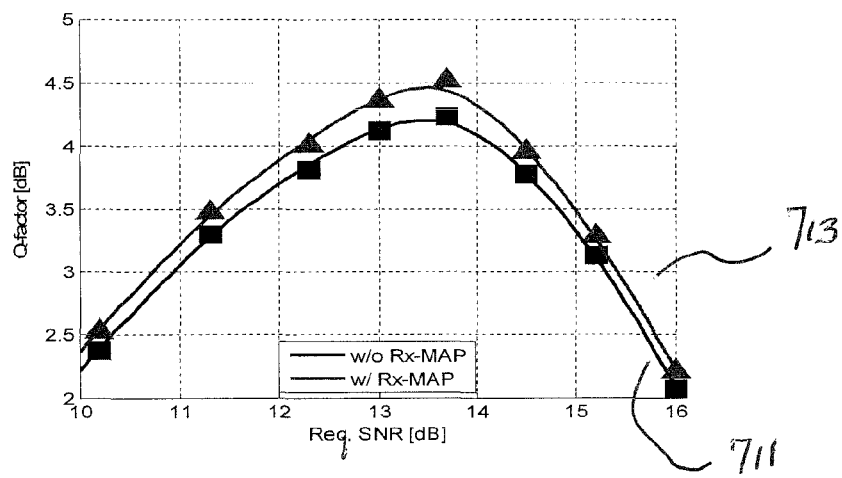
FIG. 7B depicts an exemplary graph illustrating measured transmission performance as a function of required SNR, with and without MAP based receiver correction, in accordance with an embodiment of the present principles.

A back-to-back (BTB) performance comparison is also measured at 55 GHz WDM spacing, as shown in FIGS. 7A and 7B. Namely, FIG. 7A depicts an exemplary graph illustrating a back-to-back (BTB) QAM performance comparison when applying MAP based pre-distortion at the transmitter side, as compared with a baseline signal and a target forward error correction (FEC) limit 711, in accordance with an embodiment of the present principles.

The target FEC limit (711) is the threshold at which error-free transmission after FEC decoding can be achieved. For example, if the FEC limit cannot be reached, the transmission will not be meaningful due to the excessive errors in the received bits. It is desirable to require as low SNR at the FEC limit, as this means a more sensitive system.

As depicted in FIG. 7A, theoretical 8QAM performance is plotted (line 709) representing ideal QAM for indicating the implementation penalty. The implementation penalty is the performance penalty compared to the ideal performance, and may be caused by the imperfection of hardware components, such as the limited bandwidth of digital-to-analog converters, laser phase noise, etc.

A baseline (line 701) represents a signal without any MAP pre-distortions at transmitter side or MAP based correction at the receiver side. As can be seen by 701 in FIG. 7B, the generated 52.1 Gbaud signals suffer from serious ISI effects from the limited DAC and driver bandwidth. They require ~10.8 dB SNR at the FEC limit of 4.35 dB.

By applying MAP based correction on the received signals only with the same MAP memory length of 9 symbols, the required SNR at the FEC limit is reduced (and thus "improved") to 10.1 dB at the target FEC limit, as depicted by line 703, thus showing about a 0.7 dB SNR improvement.

On the other hand, the required SNR was further reduced to 9.6 dB by applying the MAP pre-distortion at the transmitter side only, as depicted by line 705, and is thus capable of providing additional ~0.5 dB gain over the receiver-side only MAP correction.

Finally, as depicted by line 707, the SNR was even further improved to about 9.4 dB by applying both the MAP pre-distortion and MAP correction.

After applying MAP pre-distortions each time at the transmitter side, the received signals are further examined to create a new MAP LUT which is further used to update the transmitter-side MAP based pre-distortion for the next iteration. However, the Rx-side MAP based corrections can only be updated at the receiver side while the signals still suffer from the serious ISI effects at the transmitter side.

As further verified by examining the MAP correction on the signals with Tx MAP pre-distortions, there is a limited performance improvement (~0.2 dB SNR) over the case without receiver MAP correction. It may be concluded that most of the ISI effect has been pre-compensated by the transmitter side MAP based pre-distortion approach. This improvement provided by a joint MAP algorithm according to the present principles has also been observed after 9300 km transmission, as shown in FIG. 7B, which depicts an exemplary graph illustrating measured transmission performance as a function of required SNR with and without receiver MAP correction, in accordance with an embodiment of the present principles.

Namely, FIG. 7B depicts the measured 9300 km transmission performance of center subcarrier 3 as a function of required SNR, wherein line 711 depicts performance without receiver MAP correction, and line 713 depicts performance with receiver MAP correction. As demonstrated by FIG. 7B, MAP based correction at the receiver results in a lower required SNR.

A system according to the present principles may comprise one or both of the transmitter 100 and receiver 200, and may also include other elements (not shown), as readily contemplated by one of skill in the art, as well as omit certain elements. For example, various other input devices and/or output devices can be included in system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A system for optimizing signal quality in an optical communication system, comprising:

a transmitter for converting digital signals to optical signals comprising a transmitter digital signal processing chip including a pre-distortion logic and a transmitter look-up table (LUT); and a receiver operatively coupled to the transmitter for receiving and converting the optical signals from the transmitter to digital signals, the receiver comprising a receiver digital signal processing chip including a correction logic and a receiver look-up table (LUT), wherein the transmitter LUT is constructed by scaling the receiver LUT by a weight factor and is iteratively updated based on a weighted sum of the receiver LUT.

2. The system of claim 1, wherein the pre-distortion logic applies maximum a posterior (MAP) based pre-distortion on the digital signals at the transmitter based on the updated transmitter LUT, until a threshold is met.

3. The system of claim 2, wherein the threshold comprises a desired level of signal quality.

4. The system of claim 1, wherein the correction logic applies a MAP based correction on the digital signals to further improve the signal quality.

5. The system of claim 1, wherein the weight factor comprises a scaling factor for refining operation of the transmitter pre-distortion logic.

6. The system of claim 1, wherein the transmitter digital signal processing chip is operatively coupled to transmitter front ends comprising at least a modulator, drivers, and a laser for providing light to be processed by the transmitter for providing optical signals to the receiver.

7. The system of claim 1, wherein the receiver digital signal processing chip is operatively coupled to receiver front ends comprising at least an integrated coherent receiver and a laser.

8. The system of claim 1, wherein the receiver LUT is operatively coupled to the transmitter to update the transmitter LUT.

9. A receiver for mitigating signal distortion in an optical communication system comprising:
receiver front ends for receiving an optical signal;
a receiver digital signal processing chip (DSP) operatively connected to the receiver front ends, the receiver DSP including a correction logic and a receiver look-up table (LUT),
wherein the correction logic compares received optical signals with the transmitted optical signals to determine and apply a maximum a posterior (MAP) based correction, and wherein the receiver LUT is scaled by a weight factor;
further comprising a transmitter operatively coupled to the receiver, the transmitter comprising a transmitter digital signal processing chip including a pre-distortion logic and a transmitter look-up table (LUT);
wherein a weighted sum of the receiver LUT is used to construct and iteratively update the transmitter LUT.

10. The receiver of claim 9, wherein the pre-distortion logic applies MAP based pre-distortion on digital signals at the transmitter based on the updated transmitter LUT, until a threshold is met.

11. A method for optimizing signal quality in an optical communication system comprising the steps of:
applying maximum a posterior (MAP) based pre-distortion on digital signals at a transmitter, based on a transmitter look-up table (LUT);
processing and up-converting the digital signals to comprise optical signals;
processing the optical signals at a receiver to comprise digital signals;
applying MAP based correction to the digital signals at the receiver based on a receiver LUT, wherein the transmitter LUT is built up and updated based on the receiver LUT; wherein the step of applying MAP based pre-distortion is performed until a threshold is met.

12. The method of claim 11, wherein the threshold comprises a desired level of signal quality.

13. The method of claim 11, wherein the receiver LUT is provided by:
creating an initial receiver LUT from received signals passing through the transmitter without any applied pre-distortion;
comparing the received signals with the transmitted signals to determine a MAP based correction on a center symbol of a transmitted pattern; and
scaling the receiver LUT by a weight factor based on the MAP based correction.

14. The method of claim 13, wherein the weight factor comprises a scaling factor for refining operation of the transmitter MAP based pre-distortion.

15. The method of claim 11, wherein the receiver LUT is operatively coupled to the transmitter to iteratively update the transmitter LUT.

16. The method of claim 11, wherein the step of processing the digital signals includes performing pulse shaping and pre-equalization.

17. The method of claim 11, wherein the step of processing the optical signals comprises down converting the optical signals into baseband signals.

* * * * *